United States Patent [19]

Diaz

[11] 4,215,759

[45] Aug. 5, 1980

[54] GUIDANCE CONTROL SYSTEM FOR A TRACTION VEHICLE

[75] Inventor: Ricardo A. Diaz, Pittsburgh, Pa.

[73] Assignee: Westinghouse Electric Corp., Pittsburgh, Pa.

[21] Appl. No.: 642,805

[22] Filed: Dec. 22, 1975

[51] Int. Cl.² .......................... B60K 41/00; B62D 1/24
[52] U.S. Cl. ...................................... 180/168; 104/88; 318/587
[58] Field of Search ................. 180/168, 79.1; 104/88; 318/587

[56] References Cited

U.S. PATENT DOCUMENTS

| | | | |
|---|---|---|---|
| 3,039,554 | 6/1962 | Hosking | 180/79.1 X |
| 3,245,493 | 4/1966 | Barrett | 180/98 |
| 3,474,877 | 10/1969 | Wesener | 104/88 X |
| 3,495,677 | 2/1970 | Wilson | 180/98 |
| 3,540,541 | 11/1970 | Hartley | 180/98 |
| 3,610,363 | 10/1971 | Hartley | 180/98 |
| 3,669,206 | 6/1972 | Tax | 180/98 |
| 3,734,229 | 5/1973 | Comer | 180/98 |
| 3,768,586 | 10/1973 | Thompson | 180/98 |
| 3,842,744 | 10/1974 | Vis | 104/88 |
| 3,933,099 | 1/1976 | Reinhard | 180/98 |

Primary Examiner—John P. Silverstrim
Attorney, Agent, or Firm—E. F. Possessky

[57] ABSTRACT

A guidance control system is disclosed for a traction vehicle arranged to be displaced along a guide path which consists of a plurality of closed loop vertical antennae embedded beneath the surface along the path of travel. The vehicle is in two way radio communication with wayside stations equipment. Destination information in binary coded form is encoded on the vehicle and sent to the proximate loop antenna; the fact that this coded information is received at a particular segmented antenna at once identifies the location of the vehicle as well as conveys the destination intelligence. A central processor, receiving the location and destination information, of this and all other vehicles, serves as a master control to discipline each vehicle from one segmented loop to the next. From the central processor the wayside station sends traction signals to each segmented antenna loop respectively. Additionally, the fact that traction signals are sent to the vehicle over a single segmented loop at a time, establishes a magnetic field over a narrow region, and a dual antennae arrangement on the vehicle senses the magnetic field to produce error signals to steer the vehicle with precision back to the guide path.

10 Claims, 8 Drawing Figures

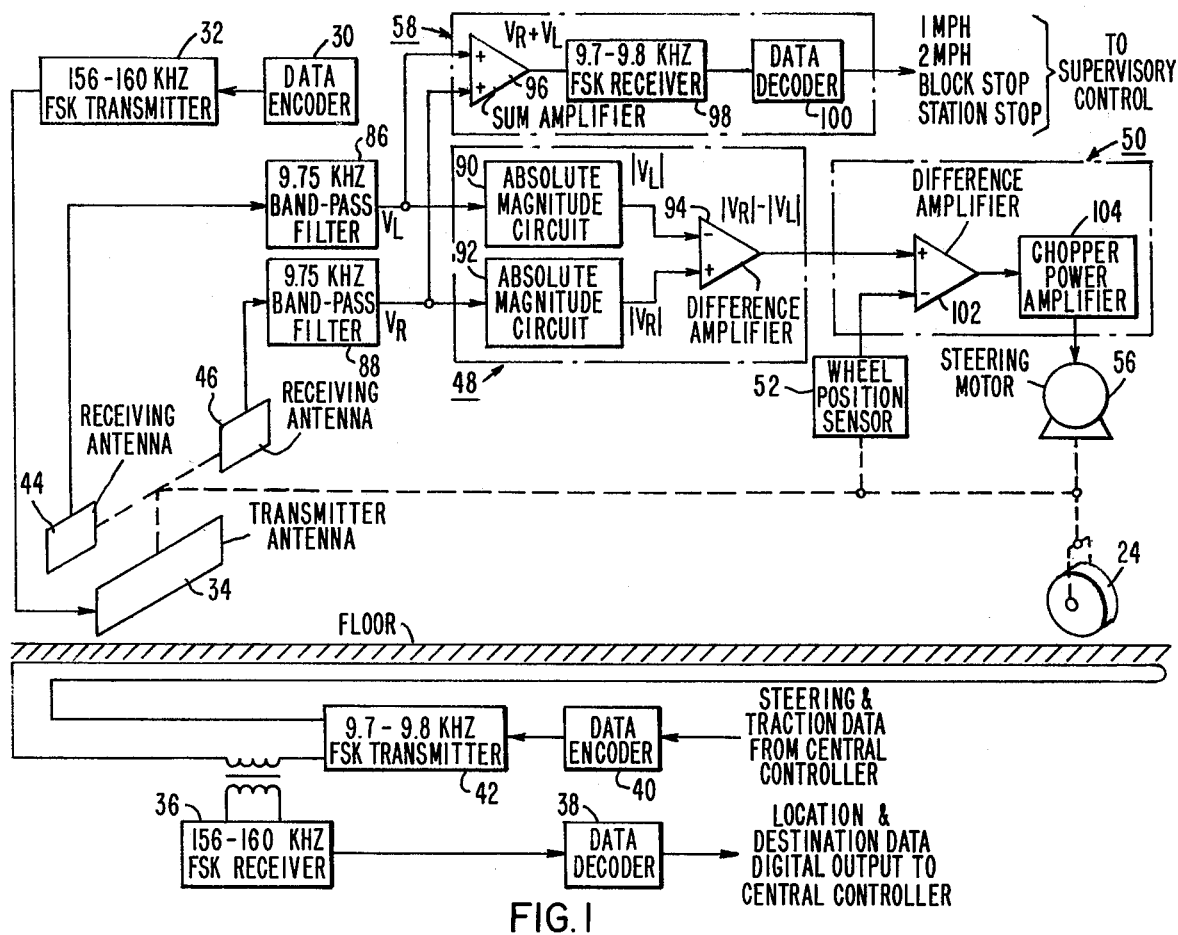
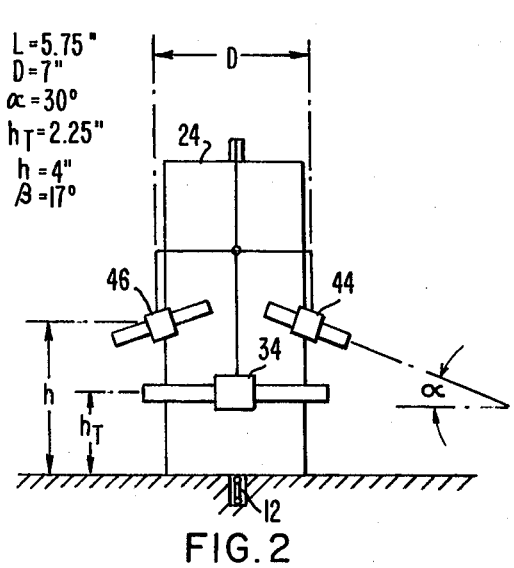
FIG.2
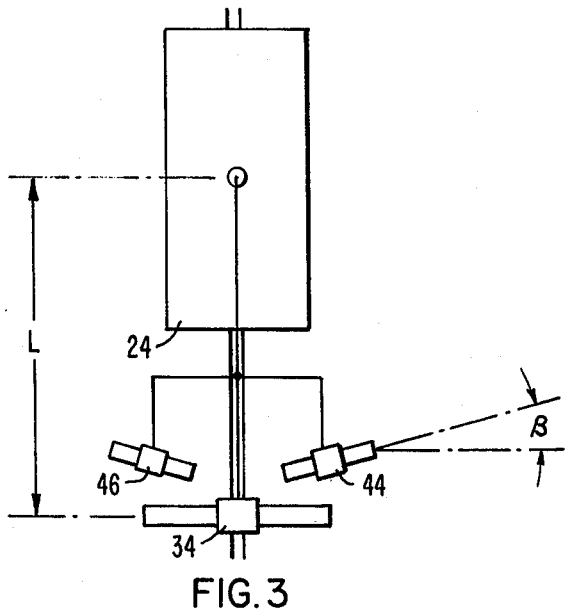
FIG.3

GUIDANCE CONTROL SYSTEM FOR A TRACTION VEHICLE

CROSS REFERENCE TO RELATED APPLICATIONS

Copending application entitled Automatic Data Processing and Control System, Ser. No. 642,806, filed on Dec. 22, 1975 in the names of F. T. Thompson, Ricardo A. Diaz and Theodore M. Heinrich and assigned to the same assignee as the instant invention.

Copending application entitled Supervisory Control System, Ser. No. 642,803 filed on Dec. 22, 1975 in the names of Gary E. Baumgart and Ricardo A. Diaz.

Copending application entitled "Self Monitoring and Sequencing for a Traction Vehicle", Ser. No. 642,804 filed on Dec. 22, 1975 in the names of Gary E. Baumgart and Ricardo A. Diaz.

BACKGROUND OF THE INVENTION

1. Field of the Invention

This invention relates to a guidance control system for the discipline of a traction vehicle along a prescribed path.

2. Description of the Prior Art

It is known in the prior art to control a vehicle so that it follows a path defined by a current carrying guide wire laid in or on the surface over which the vehicle travels. Examples of such systems are found in U.S. Pat. No. 2,317,400 to C. L. Paulus et al, and in U.S. Pat. No. 3,498,403 to Kohls.

The present invention proposes a two way radio guidance control system in which a traction vehicle sends out location and destination intelligence to a wayside station or central controller which in turn transmits steering and traction intelligence to control the vehicle. The path to be followed by the vehicle is not a single guide wire, but segmented, closed loop antennae, arranged along and defining the path of travel. The guide path thus consists of segmented vertical loop antennae, each one called a BLOCK which is the basic intelligence unit. The vehicle is commanded to be displaced successively from BLOCK to BLOCK. The fact that a vehicle is transmitting destination information into a discrete BLOCK serves both to identify the location of the vehicle as well as convey the identity of its ultimate destination. Further, when the wayside station or central processor sends steering and traction commands to a discrete BLOCK, the radiated electromagnetic energy is confined to a relatively narrow region so that sensors mounted on the vehicle front wheel assembly, can detect deviations from the proximate vertical loop antenna with precision, and generate control signals to force the vehicle back to the guide path. The sending of traction signals to only one BLOCK at a time, insures that the wayside station or central processor has control of the vehicle at all times.

SUMMARY OF THE INVENTION

The present invention provides a guidance control system for the discipline of a traction vehicle along a path comprising a plurality of vertically oriented antennae arranged in tandem. Means, adjacent the guide path, send steering and traction intelligence to the plurality of antennae. Sensing means on the vehicle are electromagnetically coupled to a proximate antenna as the vehicle moves along the path. Means, on the vehicle, coupled with the sensing means, are provided for sending location and destination coded intelligence to the sensing means. Means adjacent the guide path, receive and decode the location and destination coded intelligence for processing in deriving steering and traction coded intelligence. Means are coupled to the sensing means for receiving and decoding the traction coded intelligence and for delivering traction signals. Further, means are coupled to send sensing means, for receiving and decoding the steering coded intelligence to derive a steering signal. Means are coupled to the steering receiving and decoding means, for correcting the heading of said vehicle in response to said steering signal, and finally, means are provided, coupled to said traction receiving and decoding means for initiating and arresting displacement of said vehicle along the guide path as a function of the traction signals.

DESCRIPTION OF THE DRAWINGS

FIG. 1 is a block diagram showing the guidance control system for a traction vehicle in accordance with the invention;

FIG. 2 is a front elevational view of the vehicle antennae arrangement for the guidance control system;

FIG. 3 is a plan view of the vehicle antennae arrangement shown in FIG. 2;

DESCRIPTION OF AUTOMATIC TRANSPORT SYSTEM

Figure 7:
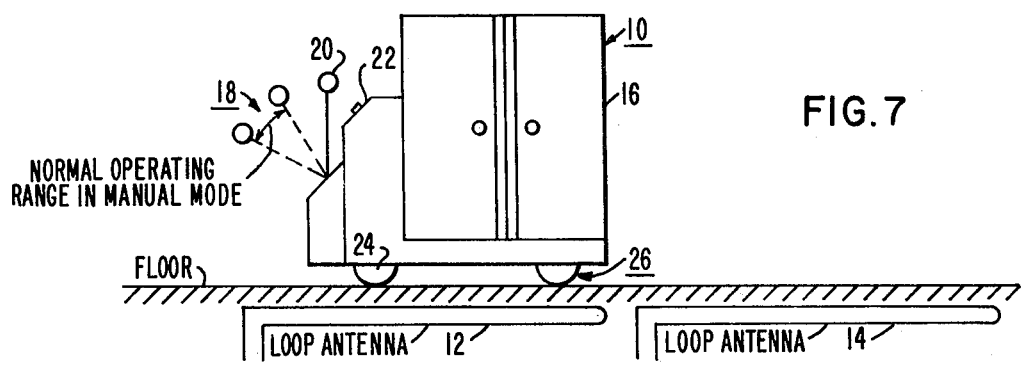
FIG. 7 is a pictorial schematic showing the traction vehicle in an operating environment.

The teachings of this invention find particular applicability in an automatic transport system (ATS) for a driverless or traction vehicle shown in FIG. 7. The traction vehicle indicated generally at 10, may be operated automatically or manually. In the automatic mode, the vehicle 10 is in two way radio communication with a central traffic controller, communication being had by means of a plurality of segmented closed loop antennae 12, 14 embedded beneath the surface along which the vehicle is to travel. The vehicle 10 may carry a modular load 16 which can be mechanically removed (by means not shown) at the destination. A handle, indicated generally at 18, has a stored position indicated at 20 when operated in the automatic mode, as well as a normal operating range when utilized in the manual mode. The selection of the automatic or the manual mode, as well as emergency stopping of the vehicle is accomplished by means of a plurality of dials and push buttons positioned on a console indicated at 22. The vehicle 10 is guided along the path provided by the loop antennas 12, 14, by means of a steering wheel 24, traction for forward and reverse displacement being provided through dual wheels indicated generally at 26.

In order to further clarify the overall operation of the ATS, reference will now be made to the block diagram of FIG. 8. As stated previously, the tractor 10 is in two way communication with a central controller. The tractor 10 receives both steering and traction control information from the central controller, while the tractor itself transmits location and destination information to the central controller. The guidance communication system for the vehicle 10 is the claimed subject matter of the instant application and will be more fully explained in connection with the description of FIGS. 1 to 6. Briefly, the operator dials in the destination of the vehicle from a station selector 28, on the console or control panel 22, to a destination data encoder 30. The encoder 30 then sends the data to a 156–160 KHz FSK transmitter 32, and from a transmitting antenna 34 on the vehicle 10, the data is radiated to a nearby vertical loop antenna, for example 12. The destination data is then received by a 156–160 KHz FSK receiver 36, sent to a data decoder 38, the output of which is transmitted to the central controller.

The central controller processes the destination data, and, cognizant where all other vehicles are located, sends traction data to the respective vehicles, selecting routes, avoiding collisions between vehicles etc. The fact that a particular tractor is sending destination data from an identified loop antenna, i.e., loop 12, advises the central controller where the tractor is located at that instant in time. The overall role of the central controller, and the cooperating auxiliary equipment is described and claimed in the copending application entitled Automatic Data Processing and Control System, Ser. No. 642,806, filed on Dec. 22, 1975 in the names of F. T. Thompson, Ricardo A. Diaz and Theodore M. Heinrich, and assigned to the same assignee as the instant invention. The traction data from the central controller is encoded by data encoder 40, and sent to a 9.7–9.8 KHz FSK transmitter 42 for transmission to vertical loop antenna 12.

The electromagnetic energy radiating from loop 12 is received by twin receiving antennae 44, 46 on the vehicle 10.

As will be more freely described infra, the dual signals from antennae 44, 46, are processed, inter alia, by guidance demodulator 48 to provide an automatic steering reference signal for the steering control 50. The actual angular displacement of the steering wheel 24 is determined by a wheel position sensor 52 which sends an error signal to the steering control 50; the algebraic summation of these two signals produces the steering command signal which is sent to the steering drive 54. Through the steering drive 54, a steering motor 56 displaces the wheel 24 in such angular displacement so as to insure that it remains centered over the vertical loop 12, as well as in alignment with the succeeding antenna loops along the guide path.

The signals from the receiving antennae 44, 46 are also processed in a separate traction data communication link shown symbolically as a receiver/decoder at 58 to provide a plurality of signals which are sent to a supervisory control unit 60 aboard the vehicle. A number of command signals may be generated, but in this particular application there are four in number:

(a) one mile per hour;
(b) two miles per hour;
(c) block stop; and
(d) station stop The supervisory control is described in the copending application entitled Supervisory Control System, Ser. No. 642,803, filed on Dec. 22, 1975, in the names of Gary E. Baumgart and Ricardo A. Diaz. Briefly, the supervisory control serves to receive manual and automatic command signals, and then properly distributes these signals to the various components involved in controlling the displacement of the vehicle. The four main control signals delivered from the supervisory control 60 are:

(a) the brake control;
(b) the reversing contactor drive control;
(c) the traction control; and
(d) the steering control.

The traction signal from the supervisory control 60 is sent to traction control 62 which, through the traction drive 64, sends the command signal to a traction motor 66, which is the prime mover providing rotary displacement for traction wheels 26. A tachometer 68 feeds back an error signal which is a function of the instantaneous rotary displacement of wheels 26, which is then algebraically summed with the traction signal from the supervisory control 60 to provide the command signal to the traction drive 64.

The supervisory control 60, when required, sends a signal to be reversing contactor drive 70, which then sends a reversing signal to the traction control 62.

The supervisory control 60 through brake control 72 controls the actuation of brake 74 for the purpose of restraining or releasing the wheels 26.

As indicated earlier, the handle 18 may be used in manual control for the vehicle 10. In the stored or upright position 22, the vehicle is ready for automatic operation. When the handle is displaced as shown in FIG. 7, it can signal forward or reverse displacements as well as speed and steering commands. These manual commands are appropriately distributed by the supervisory control as in the case of operation in the automatic mode.

Figure 8:
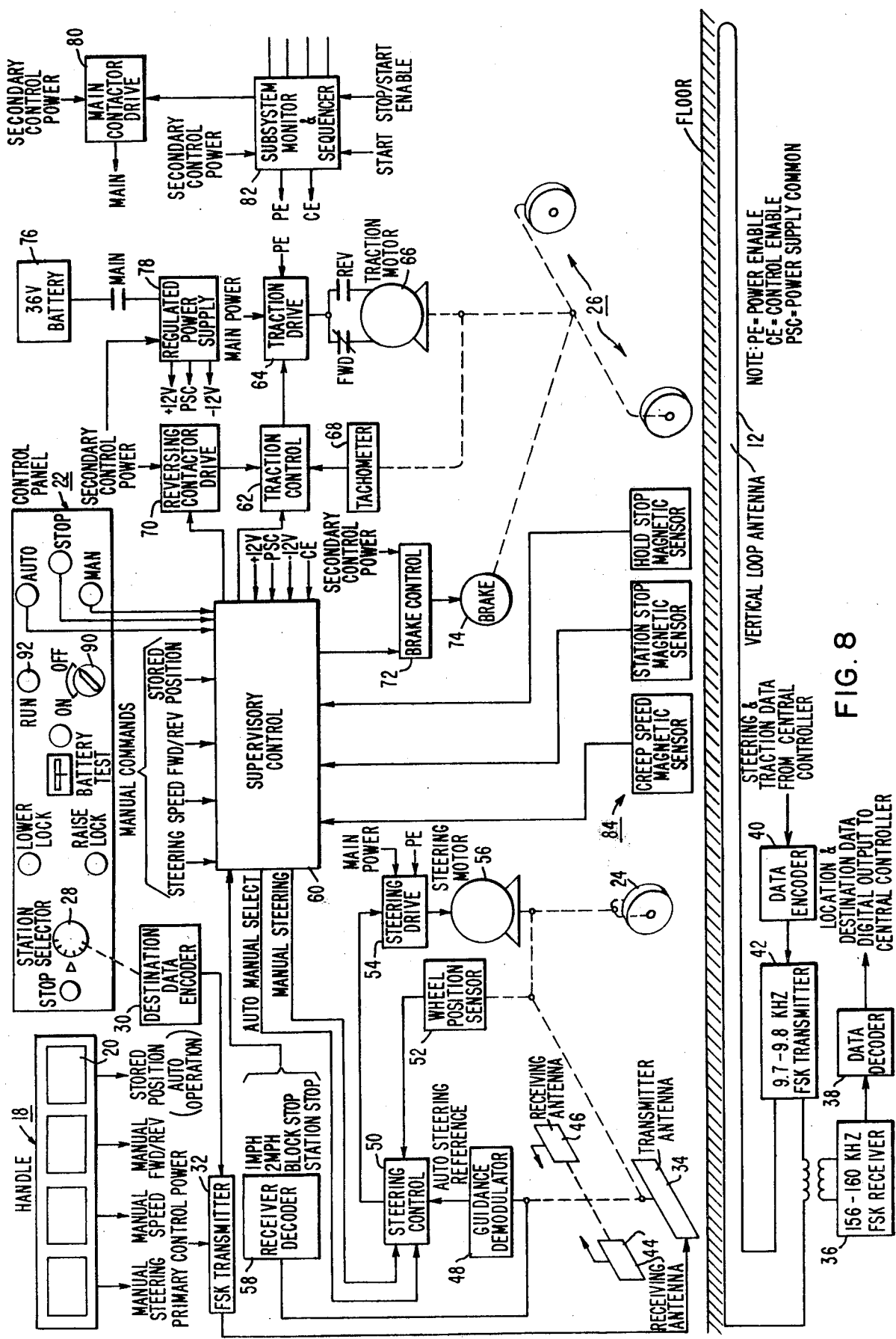
FIG. 8 is a block diagram showing the relationship of the present invention in the automatic transport system for the traction vehicle.

Completing the description of FIG. 8, the vehicle contains a battery power source 76 which comprises a set of three 12 volt lead acid batteries arranged in series. A regulated power supply 78 (+12v, PSC, −12v) is connected to battery 76 through a contact identified as MAIN, which is under the discipline of main contactor drive 80. A subsystem monitor and sequencer unit is identified at 82.

The vehicle 10 is dependent upon continuous two way communication with central control. In the event that the vehicle loses communication with the central control or loses a subsystem affecting communication, traction control or steering control, it must be able to safely shut down to prevent damage to surrounding objects as well as to human beings in the vicinity.

If precautions are not taken, the vehicle 10 could be vulnerable to the following faults:

(1) loss of steering control;
(2) loss of transmission which gives location intelligence to the control controller for preventing collision with other vehicles;
(3) loss of traction control;
(4) loss of central control commands;
(5) loss of internal power and supervisory control;
(6) loss of the power supply of the central controller; and
(7) collisions with objects not in communication with central control.

The overall monitoring system for the ATS is described and claimed in the copending application entitled "Self Monitoring and Sequencing System" Ser. No. 642,804, filed on Dec. 22, 1975 in the names of Gary Baumgart and Ricardo Diaz and assigned to the same assignee as the instant invention. A magnetic sensing arrangement is indicated generally at 84; in the practical embodiment this includes a magnetic reed switch capable of recognizing three magnetic poles embedded in the floor viz., a north pole at a station stop, and a succession of two south poles when the vehicle is to pass through automatic doors which are positioned in the path of travel. When the vehicle 10 approaches the station of destination, it recognizes a N pole and runs at creep speed preparatory to a STATION STOP.

When the vehicle 10 receives a BLOCK STOP it stops immediately. There are two other stops: STATION STOP AND HOLD STOP. The central controller sends a STATION STOP signal in both cases, but the vehicle itself makes the determination whether it is on STATION STOP OR HOLD STOP. The difference in magnetic configuration determines STATION STOP or HOLD STOP and this magnetic arrangement is recognized by the magnetic sensing means 84. The HOLD STOP is used before automatic doors. The vehicle 10 sends a signal via an adjacent antenna loop to open the automatic door. If the door does not open, a STATION STOP signal is transmitted to the vehicle 10 which then recognizes a SOUTH POLE magnet in the floor. It then proceeds at creep speed and stops at a second southpole magent; this stop is called HOLD-STOP. If the door is open, the vehicle ignores the magnets. The vehicle 10 remains on HOLD STOP until the doors are opened and the vehicle 10 then proceeds. On a true STATION STOP, i.e., the vehicle has arrived at its destination, the operator must make a new station selection, i.e., dial 28, and depress the automatic push button on the control panel 22, so that the vehicle can again proceed in the automatic mode.

GENERAL THEORETICAL CONSIDERATIONS PREFERRED EMBODIMENT

In the practical embodiment, the antenna loops 12, 14 comprise a twin lead wire cable with a distance of $\frac{3}{4}''$ between two #18 A.W.G. conductors.

Figure 4:
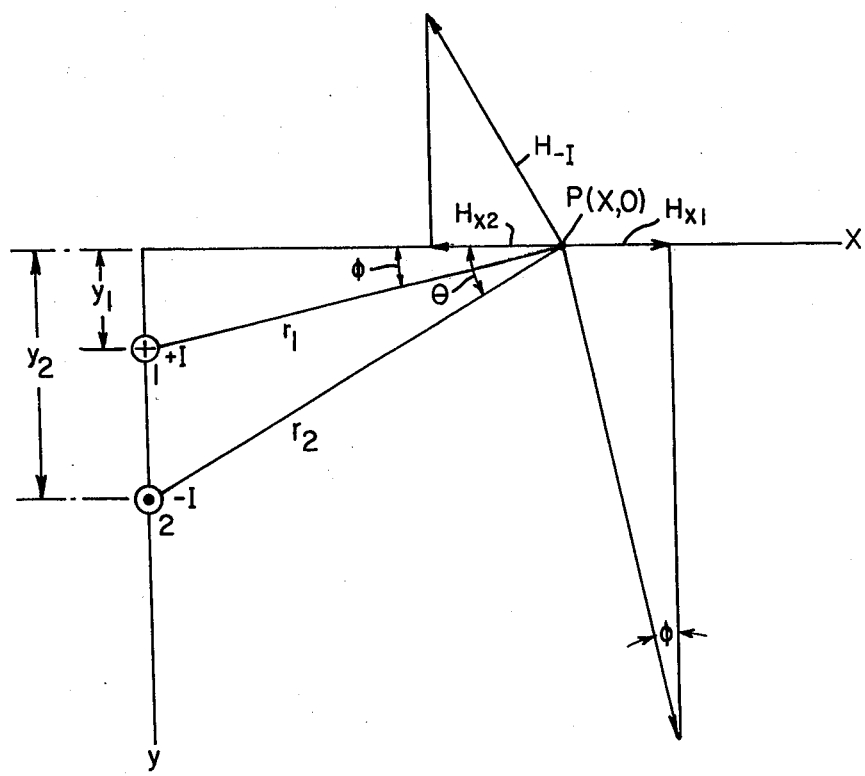
FIG. 4 is a simplified model of the vertical loop antenna depicting the magnetic field intensity H in various aspects.

In order to understand the theoretical principles consider now the simplified model of FIG. 4. The Cartesian coordinate axes x and y are identified as shown. A steady state current I flows in the wires. The symbol $\oplus$ is the steady state current flowing away from the reader; the symbol $\odot$ is the steady state current flowing toward the reader.

At an arbitrary point P(X,O), the magnetic field intensity H resulting from +I is:

$$H_{+I} = +I/2\pi r_1 \tag{1}$$

The component of $H_{+I}$ along the x axis $H_{x1}$ is:

$$H_{x1} = H_{+I} \sin\phi \tag{2}$$

$$H_{x1} = H_{+I}(y_1/r_1) \tag{3}$$

From equation (1)

$$H_{x1} = I/(2\pi r_1)(y_1/r_1) \tag{4}$$

$$r_1^2 = x^2 + y_1^2 \tag{5}$$

$$H_{x1} = (I/2\pi)[y_1/(x^2 + y_1^2)] \tag{6}$$

Similarly $$H_{-I} = -I/2\pi r_2 \tag{7}$$

The component of $H_{-I}$ along the x axis $H_{x2}$ is:

$$H_{x2} = H_{-I} \sin\theta \tag{8}$$

$$H_{x2} = H_{-I}(y_2/r_2) \tag{9}$$

$$H_{x2} = (-I/2\pi r_2)(y_2/r_2) \tag{10}$$

$$r_2^2 = (x^2 + y_2^2) \tag{11}$$

$$H_{x2} = (-I/2\pi)[y_2/(x^2 + y_2^2)] \tag{12}$$

Figure 5:
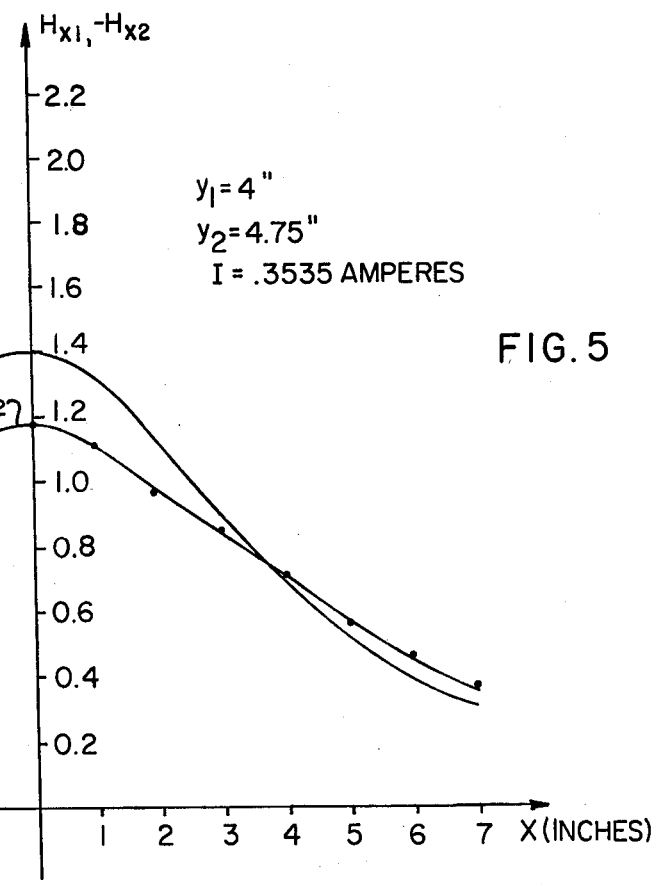
FIG. 5 is a plot of the horizontal components $H_{x1}$, $-H_{x2}$ of the magnetic field intensity vs distances along the x axis.

The horizontal magnetic field components $H_{x1}$ and $-H_{x2}$ are plotted in FIG. 5 for $y_1 = 4''$, $y_2 = 4.75''$ and the current $I = 0.3535$ amperes. The resultant horizontal component $$H_x = H_{x1} + H_{x2} \tag{13}$$

$$H_x = \frac{1}{2\pi}\left(\frac{y_1}{(x^2 + y_1^2)} - \frac{y_2}{(x^2 + y_2^2)}\right) \tag{14}$$

Figure 6:
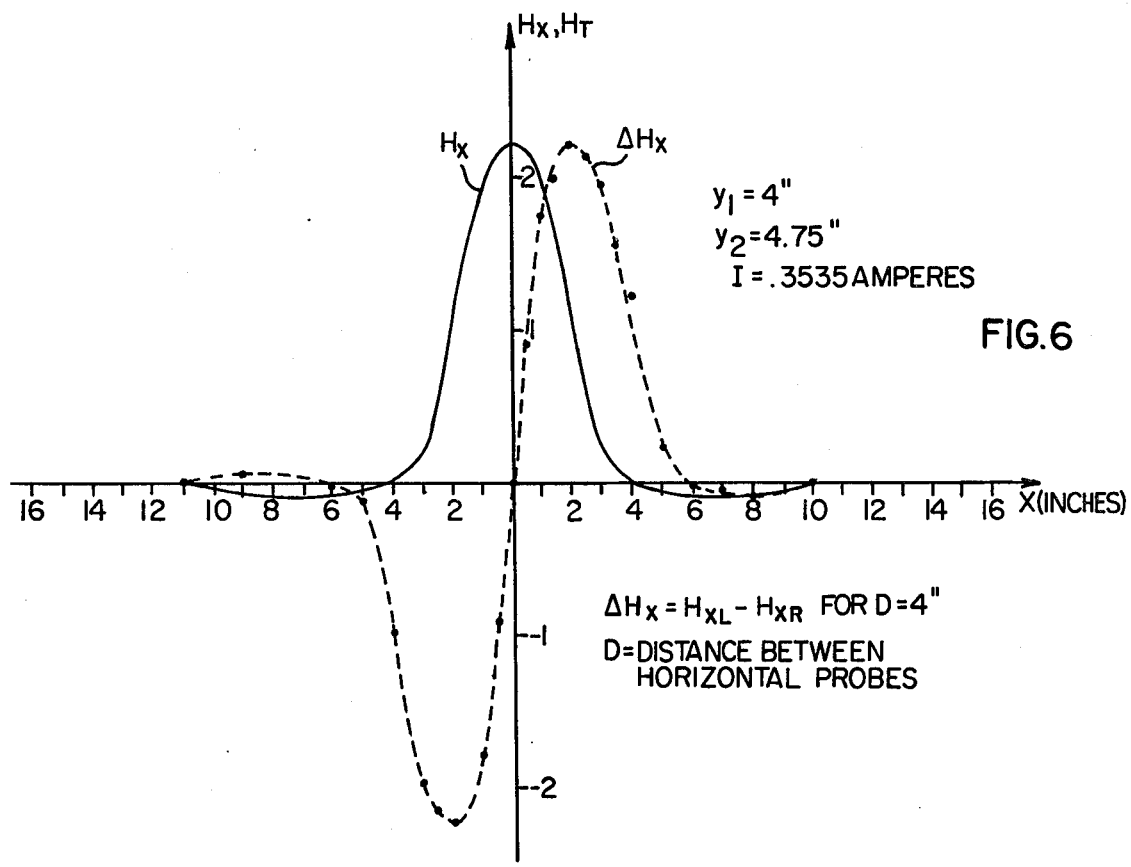
FIG. 6 is a plot of the resultant horizontal component Hx vs distances along the x axis, and a plot of $\Delta H$ along the x axis.

A plot of $H_x$ is shown in FIG. 6. If a small receiving loop of unity area is placed at P with the axis of the loop aligned with $H_x$, and it is assumed that the frequency is constant, and induced voltage V in the receiving loop is given by $$V = KH_x = \frac{KI}{2\pi}\left(\frac{y_1}{(x^2 + y_1^2)} - \frac{y_2}{(x^2 + y_2^2)}\right) \tag{15}$$

By applying the principle of reciprocity, equation (15) also determines the induced voltage for the case of a receiving loop made by shorting the ends of the twin lead cable, when a constant current circulates in the small loop placed at P. As a result equation (15) defines the transfer function between induced voltage and longitudinal distance x for the sensor unit guidance cable, and may also be used as the equation that defines the induction field pattern for the system.

If two receiving loops separated a distance D, are placed at a constant height $(y_1 - y_2)$ from the twin lead cable, the differential induced voltage between them is $$\Delta V = KH_x = K(H_{xL} - H_{xR}) \tag{16}$$

where
 $H_{XL}$ = the horizontal component of the magnetic field intensity in the left receiving loop
 $H_{xR}$ = the horizontal component of the magnetic field intensity in the right receiving loop $$V = \frac{KI}{2\pi}\left[\frac{y_1}{x^2+y_1^2} - \frac{y_2}{x^2+y_2^2} - \frac{y_1}{(x-D)^2+y_1^2} + \frac{y_2}{(x-D)^2+y_2^2}\right] \tag{17}$$

This function is plotted in dotted lines in FIG. 5. From a study of the plot of $\Delta H$ in FIG. 6, it will be observed that two receiving loops may be used as a position transducer with approximate linear characteristics between peaks.

DESCRIPTION OF A PREFERRED EMBODIMENT

A function block diagram of the preferred embodiment for the guidance communication system is shown in FIG. 1. The output of receiving antenna 44 is applied to a 9.75 KHz band pass filter and the output from receiving antenna 46 is applied to a 9.75 KHz band pass filter 88. The filter outputs are applied to the receiver decoder 58 and the guidance demodulator 48.

The guidance demodulator 48 comprises absolute magnitude circuits 90, 92, and a difference amplifier 94.

The receiver decoder 58 comprises summation amplifier 96, a 9.7-9.8 KHz 2 FSK receiver 98 and a data decoder 100.

The steering control 50 comprises a difference amplifier 102 and a chopper power amplifier 104.

FIGS. 2 and 3 are front elevational and top plan views depicting the arrangement of the receiving and transmitting antennae and their dimensional relationships. The two receiving antennae 44, 46 and the transmitter antenna 34 form part of the same assembly that is solidly mounted on the front wheel 24 of the vehicle 10. The coils are wound on cores of high permeability. The front view (FIG. 2) shows that the receiving antennae 44, 46 are mounted in skew fashion. The distance h and the angle $\alpha$ are selected to broaden the linear range of the differential voltage between the antennae (Equation 7), maintaining the amplitude to an acceptable level for amplification. When h and $\alpha$ increases, the point where $H_x$ changes phase, namely, $$y_1/(x^2+y_1^2)=y_2/(x^2+y_2^2)$$

moves toward the outside, increasing the linear range up to certain limits. D, the distance between the antennae, is determined by locating the centers of the receiving antennae in the middle of the linear range between one of the peaks and the zero crossing (FIG. 5). The angle $\beta$ in the plan view FIG. 3 is selected to provide a wider angle of capture for the guidance system. The dimensions that experimentally were found to produce the best compromise for the sensor unit are shown in FIG. 2.

OPERATION

The guidance communication system of this invention enables two way radio communication between the vehicle 10 and the central controller.

The central controller provides steering and traction intelligence for the vehicle 10. The loop antennae are excited by local line drivers. Thus, the FSK transmitter 42 sends a 9.7-9.8 KHz signal to the loop antenna 12 which establishes a magnetic field over a narrow region as previously explained. The receiving antennae 44, 46 mounted on the steering wheel 24, each receive a signal which is a function of its position relative to the loop antenna 12. Thus, the induced voltage $V_L$ in the left antenna may be different from the induced voltage $V_R$ in the right antenna. The signals $V_L$ and $V_R$ are filtered by the band pass filters 86, 88 in each channel to remove the undesired frequencies, and applied to absolute magnitude circuits 90, 92. The signals $|V_L|$ and $|V_R|$ are applied to difference amplifier 94 to deliver the output $|V_R|-|V_L|$.

The output $|V_R|-|V_L|$ is applied to difference amplifier 102 which also receives a voltage signal which is a function of the angular position of the steering wheel over the loop antenna 12. The output of the difference amplifier 102 is applied to the chopper power amplifier 104 which continuously delivers a command signal to the steering motor until $V_R=V_L$. In this manner, the steering wheel 24 is disciplined to remain centered over the plurality of loop antennae defining the guide path.

The signals from the band pass filters 86, 88 are also applied to the summation amplifier 96 and added together to provide a uniform signal level across the guide path. The resulting signal is fed to the 9.7-9.8 KHz FSK receiver 98, and then to data decoder 100 where the data is decoded to provide the signals: 1 mph, 2 mph, block stop or station stop, which are sent to the supervisory control 60 which then delivers the signals to traction control 62, the brake control 72 etc. (There is no reverse backward displacement in the automatic mode; backward displacement is accomplished only in the manual mode.) The central controller signals viz. 1 mph, 2 mph (block stop station stop) are predicated on the fact that it knows where every vehicle is located and the location of all stations. No two vehicles are permitted in the same block at the same time, and a vehicle will not be given a go-ahead signal, i.e., 1 mph, 2 mph until the succeeding block is unoccupied. The hold stop is a temporary stop where the guide path passes through doors. Thus, the vehicle is temporarily blocked until another signal is received that the doors have been opened. The station stop is given when the destination data coincides with the station destination.

The vehicle 10 provides location and destination information to the central controller. The operator dials in the destination of the vehicle 10 from a station selector 28 on the console 22 which operates a rotary switch the opening and closing of which provides a binary coded digital destination signal to a data encoder 30. The encoder 30 then sends the data to the 156-160 KHz FSK transmitter 32, and from the transmitting antenna 34 on the vehicle 10, the data is radiated to a nearby vertical loop antenna, for example, 12. The data is then received by the 156-160 KHz receiver 36, sent to a data decoder 38, the output of which is transmitted to the central controller. As indicated previously, the fact that a vehicle is transmitting from a particular antenna, i.e., 12, defines its location.

I claim:

1. A guidance control system for the discipline of a traction vehicle comprising:
   (a) a plurality of discrete antennae (FIG. 7:12,14) arranged in tandem to define a guide path;
   (b) means (FIG. 1:40,42) adjacent said guide path for sending steering and traction coded intelligence to said plurality of antennae respectively;
   (c) antenna means (FIG. 1:44,46) for receiving said steering and traction coded intelligence, said receiving antenna means being positioned on said vehicle and being electromagnetically coupled to proximate antennae successively along said guide path respectively;
   (d) antenna means for transmitting (FIG. 1:34) mounted on said vehicle, said transmitting antenna means being electromagnetically coupled to a proximate one of said discrete antennae;
   (e) transmitter means (FIG. 1:30,32) on said vehicle coupled with said transmitting antenna means for sending destination coded intelligence to said transmitting antenna means;

(f) means (FIG. 1:36,38) adjacent said guide path for receiving and decoding said destination coded intelligence from said discrete antennae respectively with the vehicle location being signified by detection of the particular discrete antenna providing the coupling for the vehicle transmission;

(g) decoder means (FIG. 1:58) coupled to said receiving antenna means for receiving and decoding said traction coded intelligence and delivering traction signals;

(h) guidance demodulating means (FIG. 1:48) coupled to said receiving antenna means for receiving and decoding said steering coded intelligence and for delivering a steering signal;

(i) steering control means (FIG. 1:50) coupled to said demodulator means for correcting the heading of said vehicle in response to said steering signal; and (j) means (FIG. 8:62,64,66) coupled to said guidance demodulating means for initiating and arresting displacement of said vehicle along said guide path as a function of said traction signal.

2. A guidance control system according to claim 1 wherein each antenna of said guide path antennae is a vertical closed loop.

3. A guidance control system according to claim 1 wherein said steering and traction coded intelligence sending means comprises a frequency shift keying transmitter coupled to said guide path antennae respectively.

4. A guidance control system according to claim 1 wherein said receiving antenna means comprises dual receiving antennas, mounted symmetrically in spaced relationship to each other in operating position astride said guide path.

5. A guidance control system according to claim 1 wherein said transmitter means comprises a frequency shift keying transmitter.

6. A guidance control system according to claim 1 said means for receiving said location and destination coded intelligence comprises a frequency shift keying receiver.

7. A guidance control system according to claim 4 comprising a pair of band pass filters connected to said dual receiving antennas respectively, and said decoder means comprises a summation amplifier, a frequency shift keying receiver and a data decoder connected in cascade, the inputs of said summation amplifier being connected to the outputs of said pair of band pass filters respectively.

8. A guidance control system according to claim 4 comprising a pair of band pass filters connected to said dual receiving antennas respectively, and said guidance demodulating means comprises a pair of absolute magnitude circuits, and a difference amplifier, said absolute magnitude circuits being connected respectively to said band pass filters to receive voltage signals which are respectively a function of the deviation of the vehicle heading from the center of said guide path, said voltage signals being applied to said difference amplifier, the output of which is said steering signal.

9. A guidance control system according to claim 8 wherein said steering control means for correcting vehicle heading comprises a difference amplifier, a servo loop and a directional steering motor connected in cascade, said difference amplifier receiving said steering signal and an error signal from said servo loop which is a function of heading error, the difference in said steering and error signals being the command excitation signal to said directional steering motor.

10. A guidance control system for the discipline of a traction vehicle comprising:

(a) a plurality of closed loop vertically oriented antennae (FIG. 7:12,14) arranged in tandem to define a guide path;

(b) a first frequency shift keying transmitter (FIG. 1:42) means, adjacent said guide path, modulating at frequencies $f_1$, $f_2$ for sending steering and traction coded intelligence to said vertically oriented antennae respectively, (c) a transmitter antenna (FIG. 1:34) and dual receiving antennae (FIG. 1:44,46) on said vehicle, said dual receiving antennae being mounted symmetrically in operating position astride said guide path;

(d) a pair of band pass filters (FIG. 1:86,88) on said vehicle connected to said dual receiving antennae respectively, (e) second frequency shift keying transmitter (FIG. 1:32) means on said vehicle coupled to said transmitter antenna, modulating at frequencies $f_3$, $f_4$ for sending destination coded intelligence to a proximate one of said vertical closed loop antennae, (f) first frequency shift keying receiver (FIG. 1:98) means on said vehicle connected to said band pass filters for receiving said traction modulated intelligence signals $f_1$, $f_2$ and for delivering traction signals, (g) means including second frequency shift keying receiver means (FIG. 1:36) adjacent said guide path for receiving and decoding said destination intelligence signals $f_3$, $f_4$, with the vehicle location being signified by detection of the particular vertical closed loop antenna providing the coupling for the vehicle transmission said second frequency shift keying receiver means delivering its output data for processing in deriving said steering and traction coded intelligence, (h) a pair of absolute magnitude circuits (FIG. 1:90,92) on said vehicle connected to the output of said band pass filters to receive voltage signals which are respectively a function of the deviation of the vehicle heading from the center of said guide path;

(i) difference amplification means (FIG. 1:94) on said vehicle connected to said absolute magnitude circuits to deliver steering signals, (j) means (FIG. 1:50) on said vehicle for receiving said steering signals and for correcting the heading of said vehicle in response thereto; and (k) means (FIG. 1:100) on said vehicle coupled to said first frequency shift keying receiver for receiving said traction signals, for initiating and arresting displacement of said vehicle along said guide path.

* * * * *